(12) United States Patent
Overtoom et al.

(10) Patent No.: US 6,732,218 B2
(45) Date of Patent: May 4, 2004

(54) DUAL-ROLE COMPATIBLE USB HUB DEVICE AND METHOD

(75) Inventors: Eric J. Overtoom, Grayslake, IL (US); Mark R. Braun, Arlington Heights, IL (US); Mark Carlson, Round Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/206,286

(22) Filed: Jul. 26, 2002

(65) Prior Publication Data

US 2004/0019732 A1 Jan. 29, 2004

(51) Int. Cl.[7] ................................................ G06F 13/36
(52) U.S. Cl. ........................ 710/313; 710/311; 710/316
(58) Field of Search ................................. 710/311, 313, 710/110, 316, 305, 38; 370/362

(56) References Cited

U.S. PATENT DOCUMENTS

| | | | | |
|---|---|---|---|---|
| 5,784,581 A | * | 7/1998 | Hannah | 710/110 |
| 6,308,239 B1 | * | 10/2001 | Osakada et al. | 710/316 |
| 6,600,739 B1 | * | 7/2003 | Evans et al. | 370/362 |

* cited by examiner

Primary Examiner—Khanh Dang
(74) Attorney, Agent, or Firm—Marshall, Gerstein & Borun LLP

(57) ABSTRACT

A Universal Serial Bus hub apparatus and method is disclosed that is compatible with the On-the-Go (OTG) supplement to the USB 2.0 specification so as to enable dual-role devices (OTG devices) to be connected via a hub. The hub includes a number of ports that are configured to connect the hub to one or more external devices, which may include OTG devices. A controller within the hub controls operations therein. The hub also includes a port switching device controlled by the controller for selectively allowing one of the number of ports to act as a host port and the other remaining ports to act as device ports.

28 Claims, 13 Drawing Sheets

DUAL-ROLE COMPATIBLE USB HUB DEVICE AND METHOD

BACKGROUND

The present invention relates to computer networking and, more particularly, to a universal serial bus (USB) hub device that is compatible with dual-role compatible devices such as USB On-the-Go (OTG) devices.

A common host-device protocol is the universal serial bus (USB) protocol. USB is a high speed serial bus that supports devices such as keyboards, printers, scanners, pointing devices, personal data assistants (PDA's) and cellular telephones. USB has become a standard within the computer industry as this protocol affords networking of multiple devices with minimal connections and user friendliness.

In a typical USB architecture, two or more devices are interconnected for communication. These devices are generally referred to as USB devices, which are defined by hardware and software components within the USB device. Generally, there are one or more USB devices that are defined as peripheral or "slave" devices, which may be input or output devices. Examples of typical peripherals include printers, modems, scanners or any other devices that exchange data with a host computer (or "master" device). The peripheral devices may be connected directly to a host or connected via a USB hub. Transactions occur between the peripherals and the host. The host controls the transactions between the peripheral devices and the host. Typically, the host controls the transactions according to the requirements of the USB 2.0 specification.

After the initial USB 2.0 specification was written, it was recognized that many peripheral devices, particularly portable devices, would benefit from being able to communicate directly with each other over the USB interface. However, since USB communication can only take place between a host (usually a personal computer) and a peripheral device, in order to qualify as a host, a device must take on several characteristics including storage for a large number of device drivers, the ability to source a large current and a series "A-type" host connector receptacle. It is not practical, however, for portable devices to have all of these characteristics. Moreover, in many cases these characteristics are not necessary in order to interface portable devices with each other. Accordingly, a supplement to the USB 2.0 specification was developed to enable peer-to-peer communication without the use of a personal computer or traditional host device. This supplement is commonly referred to as "On-the-Go" (OTG). Hence, On-the-Go (OTG) peripherals are classified as dual role devices (DRD's) that are able to operate as either a host controller or as a peripheral device dependent on the particular use the device is undergoing at a specific time. The devices are able to exchange the host controller functionality using a protocol device in the OTG supplement to the USB 2.0 specification. Additionally, the OTG supplement includes assurance that when these peripheral devices are attached to a standard host (i.e., a personal computer) the devices are only able to operate as peripherals.

Within the USB OTG supplement, operation between two peripheral devices is defined. Specifically, definitions sufficient to support this operation are included for aspects of host negotiation protocol (HNP) and the actions of transferring the host capability between two communicating devices. These devices are described as the "A-device" and the "B-device" and are determined based on which end of the connecting USB cable is attached to the device. According to the OTG supplement, the "A-device" starts out as the host in all transactions and always provides bus power ($V_{bus}$). This protocol and operation, however, does not support transfer of host functionality when more than two devices are used in a system.

Typically in USB, multiple devices may be attached using multiple USB ports on one device or by using a USB hub. However, in a system that would involve a hub where multiple OTG devices (as well as non-OTG devices) are attached, any of the OTG devices may desire to be the host of the system at various times using the resources of the other devices connected to the hub. Current USB hubs, however, do not support the transfer of the host functionality because typical hub structures are configured to have a single host connection that is fanned out to multiple device connections. Thus, a conventional USB hub is unable to change which port is the host port and participate in signaling required to support OTG host transfer protocol.

DETAILED DESCRIPTION OF THE PREFERRED EXAMPLES

Figure 1:
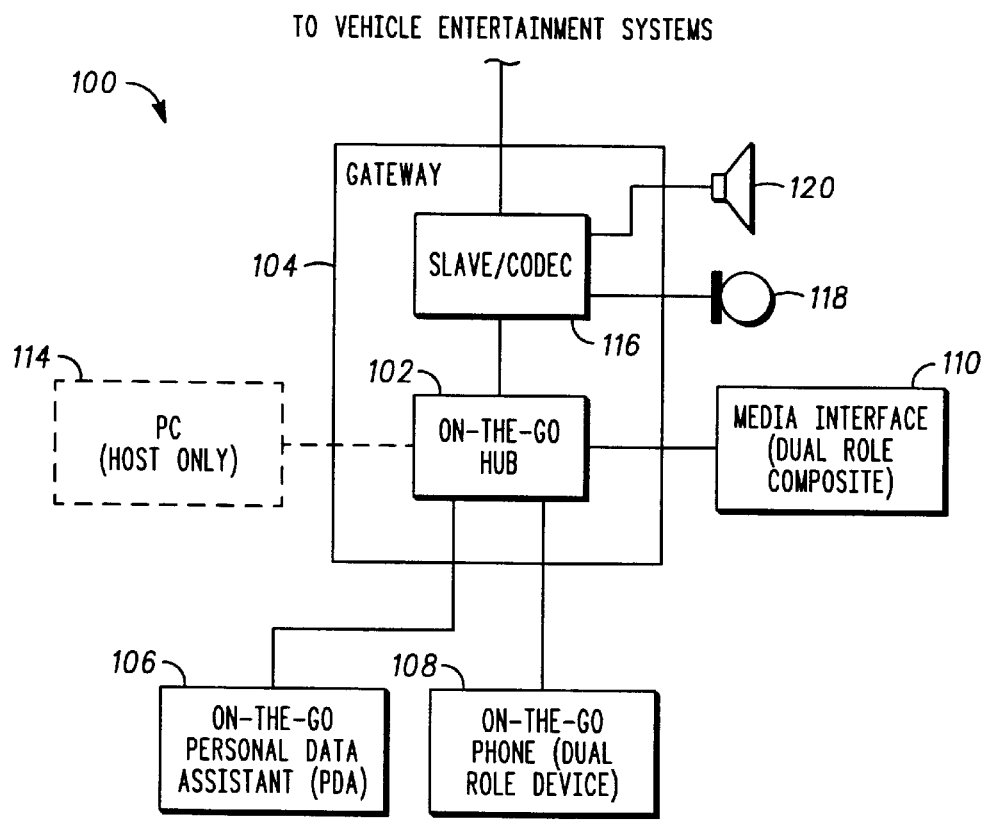
FIG. 1 illustrates an example of a system having On-the-Go devices connected with an On-the-Go hub constructed in accordance with the teachings of the present invention.

An example of a system configuration 100 is illustrated in FIG. 1 utilizing an On-the-Go hub 102 constructed in accordance with the present disclosure. The system 100 may be any one of various systems where numerous devices are interconnected and, more particular, dual-role devices according to the USB OTG supplement. In the particular example of FIG. 1, this configuration might be found in an automobile, for example. In the system 100 a gateway 104 may be utilized that contains the On-the-Go hub 102. Various devices may then be connected to the hub 102 within the gateway 104 such as a personal data assistant 106, an On-the-Go phone 108 or a media interface 110. Thus, in this system 100 it may be possible for the phone 108, for example, to access contact information within the PDA 106. As another example, the media interface 110 may utilize the display of the PDA 106 to play back video clips. In each of these examples, the device (i.e., the phone 108 or media interface 110) is required to be the host of the system 100. Furthermore, at different points in time when the various devices become host of the system, the host functionality must be transferred according to the USB 2.0 specification and the OTG host negotiation protocol (HNP). Accordingly, the hub 102, which is designed to accommodate On-the-Go capability, should preferably be able to perform one or more of the following functions:

(1) Designate any of the ports in the hub to be the host port and configuring all other ports to be downstream ports;
(2) Participate in OTG host negotiation protocol;
(3) Remain compliant with USB hub requirements for any given host port configuration; and
(4) Provide conventional hub functionality of a personal computer or other standard host devices attached to the hub.

In accordance with the last criterion enumerated above, a Personal Computer 114 is shown optionally connected to the On-the-Go (OTG) hub 102 whereupon the remainder of the devices 106, 108 and 110 will revert to a USB peripheral mode. Additional items may include non-OTG peripherals such as a Slave/Codec (Coder-Decoder) 116 that, in turn, is connected to a speaker 118 and a microphone 120 such as those that may be used in a hands-free telephone.

Figure 2:
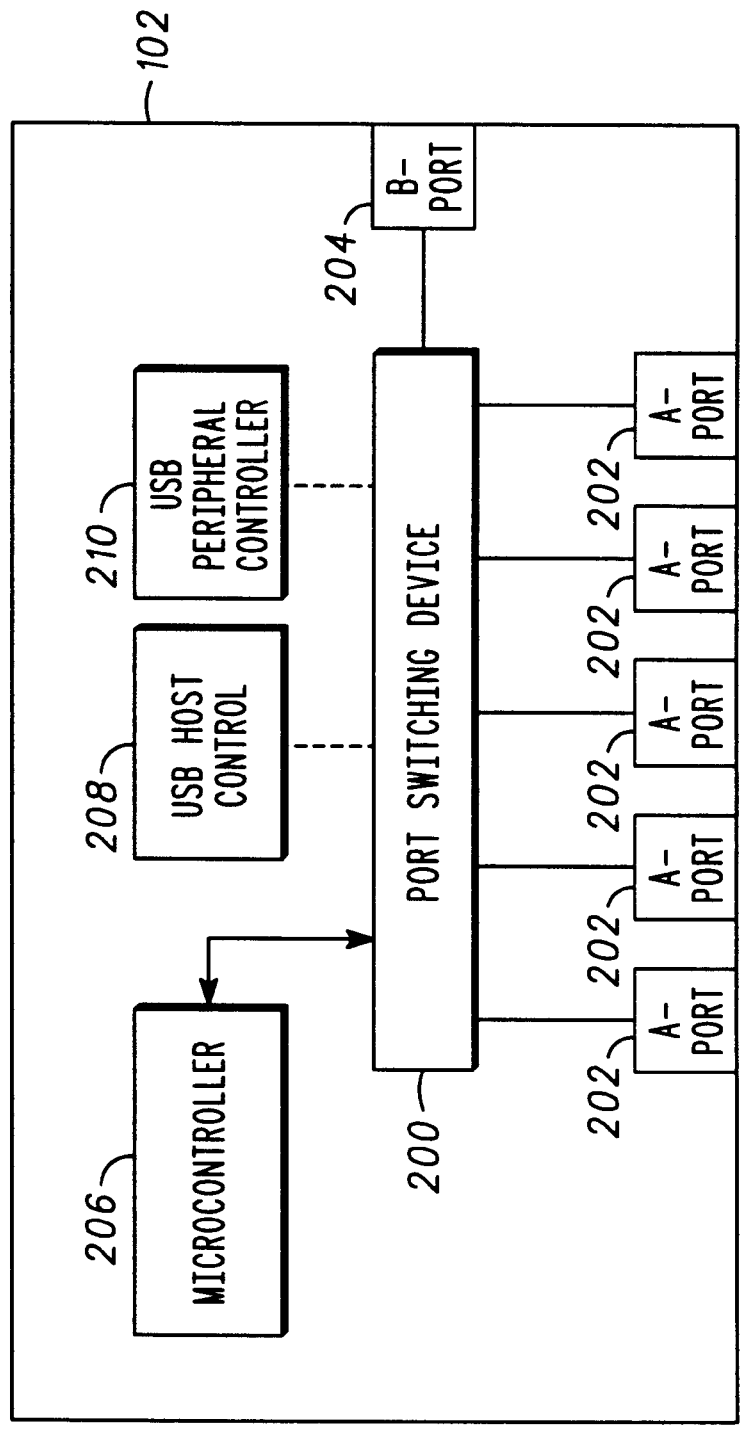
FIG. 2 illustrates an example of a block diagram configuration of an OTG hub.

A block diagram of an example OTG hub 102 is illustrated in FIG. 2. The hub 102 includes a port switching device 200 that serves to physically switch signals between a plurality of A-type ports 202. Additionally, a B-type port 204 may be included and connected to the port switching device 200. This B-type port 204 is an override port to which the hub 102 always defers host control when a PC, for example, is connected thereto. In order to control the operation of the port switching device 200, a microcontroller 206 is provided to effect switching operation within the port switching device 200.

Also included within the hub 102 are a USB host controller 208 and a USB peripheral controller 210, both being connectable to the port switching device 200. The purpose of the USB host controller 208 is to effect host control when none of the devices connected to the A-ports 202 are assuming host control and a PC is not connected to the B-port 204. Thus, the USB host controller 208 enables the hub 102 to act as a host when no other devices, such as On-the-Go devices, in particular, are asserting host control. Similarly, the USB peripheral controller 210 is provided for those instances where either an external OTG device connected to one of the A-ports 202 or a PC connected to the B-port 204 have asserted host control and the hub 102 is required to appear as a device rather than a host in order to comply with the USB 2.0 specification.

Figure 3:
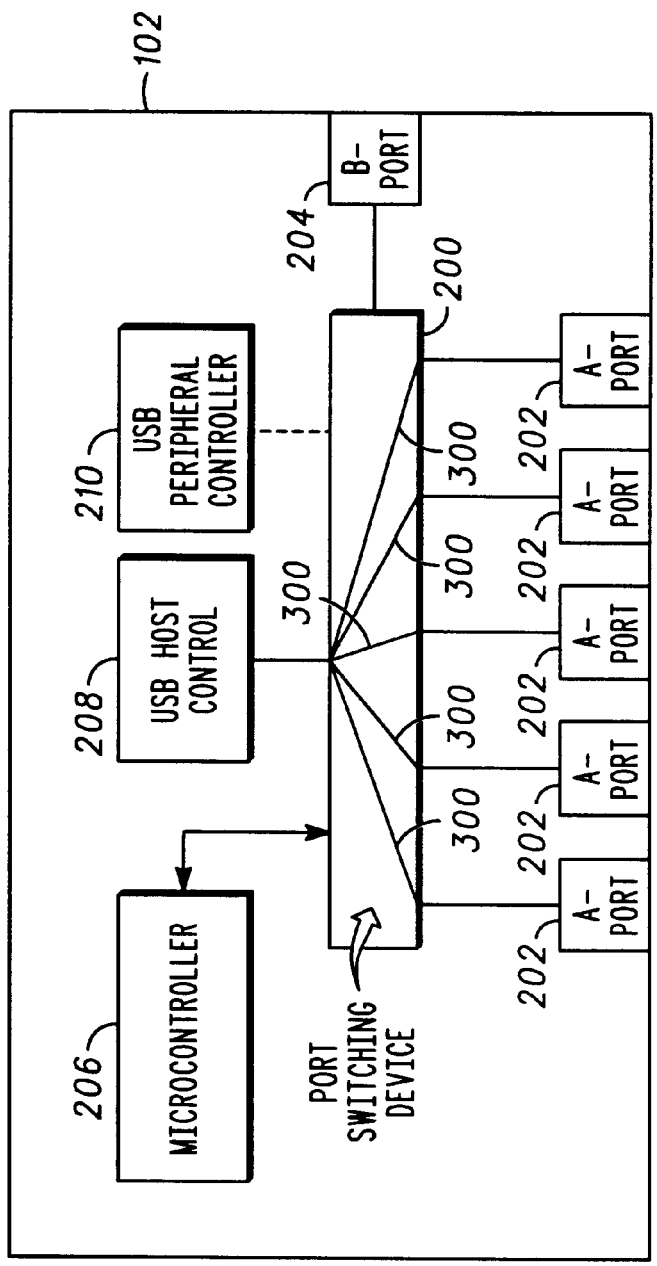
FIG. 3 illustrates a block diagram showing initial port connections in the hub of FIG. 2.

In operation, when the hub 102 is first powered up the USB host controller 208 asserts host control by placing a voltage $V_{bus}$ on the A-ports 202. Thus, the hub 102 acts as a host controller via the USB host controller 208 as illustrated in FIG. 3 by connection lines 300. The USB host controller 208 then determines which of the A-ports 202 have a corresponding external device connected thereto. In turn, the host controller 208 assigns addresses to each of the A-ports 202 having an external device connected thereto, effectively assigning addresses to those devices. Additionally, the host controller 208 will then enable a host negotiation protocol (HNP) feature on those external devices. It is noted that the hub 102 is not required to configure the devices since the hub 102 will not actually use the resources of those devices. Additionally, the hub 102, either using the USB host controller 208 and/or the microcontroller 206, determines which of the external devices are host negotiation protocol (HNP) capable for use in differentiating between disconnects and requests for host control. Once initialization is complete, the hub 102 enters a state where it waits for one of the external OTG devices (not shown) to request host control of the USB bus. This state is shown as state 400 in the state diagram illustrated in FIG. 4.

Figure 4:
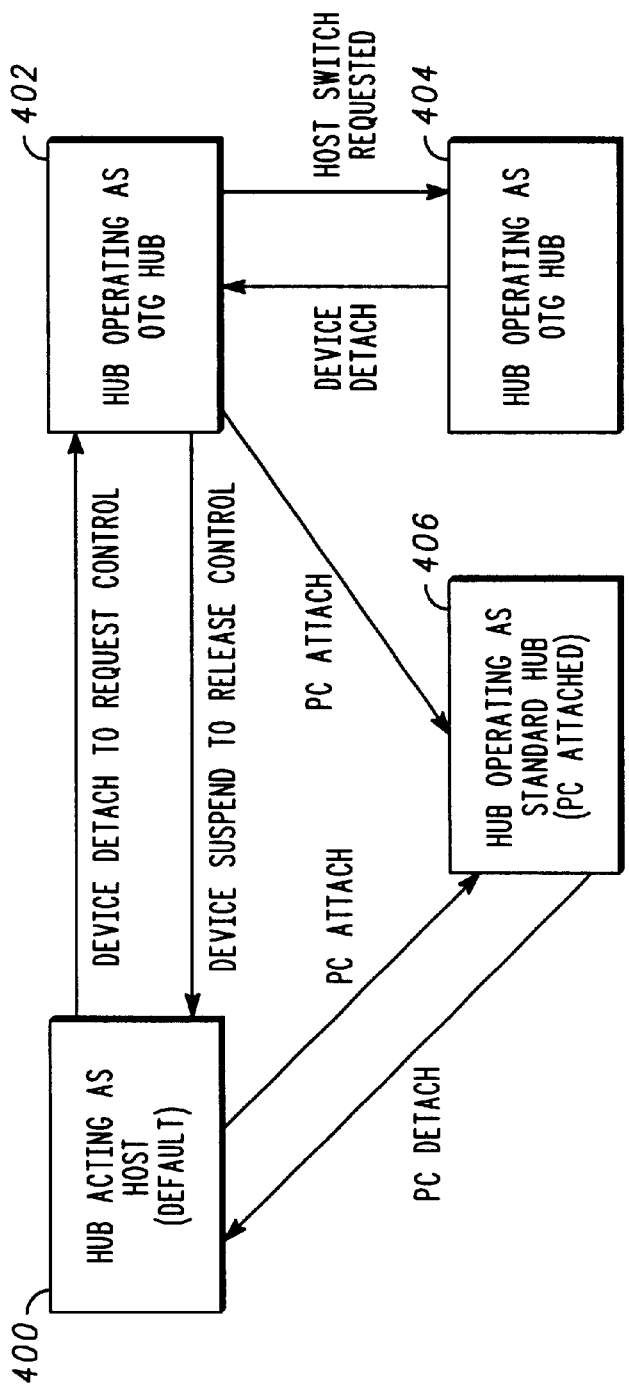
FIG. 4 illustrates a state diagram for an OTG hub operating in accordance with the teachings of the present invention.
Figure 5:
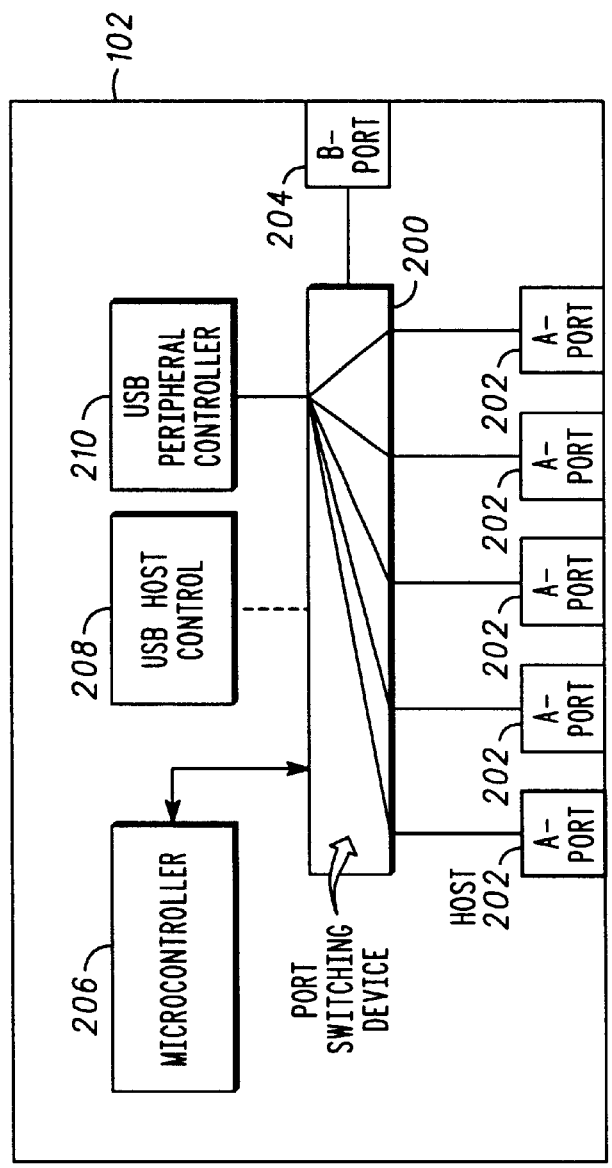
FIG. 5 illustrates an alternate port connection of the hub of FIG. 2.

When a device connected to one of the A-ports 202 desires to obtain host control, that specific device requests the bus by removing a pull-up resistor (not shown) from a data line D+ (i.e., one of the wires in the USB cable transmitting the USB protocol signals). After a device requests the USB bus, the hub 102 will transfer host control to that device in accordance with the host negotiation protocol (HNP) described in the OTG supplement to the USB 2.0 specification. The hub 102 will then internally reconfigure the port switching device 200 under the control of the microcontroller 206 such that an A-port 202 connected to the device requesting the bus is configured as the upstream port as illustrated in FIG. 5. As shown in this figure, the port switching device 200 configures one of the A-ports 202, labeled as 202$_{Host}$, to be directly connected to the remainder A-ports 202 and to the USB peripheral controller 210. After the hub 102 completes reconfiguration of the port switching device 200, the device connected to the A-port 202$_{Host}$ is enabled to begin the process of generating USB bus traffic. Additionally, the device connected to the A-port 202$_{Host}$ is allowed to enumerate the hub, i.e., assign specific addresses to the other ports, and, thus, to the external devices. After the device enumerates the hub 102, the device then enumerates the other devices in the system and, if appropriate, enables them for host negotiation protocol (HNP). It is noted that enabling the other devices for HNP depends on the operation of the host device. For example, in some cases enabling other devices for HNP will be restricted to when the host is idle and in other cases the host device may allow HNP to be performed while it is active, which will be discussed later. The above-described operation is represented in the state diagram of FIG. 4 as the transfer from state 400 to state 402 where the hub operates as an OTG hub based on a device requesting control through disconnect of its pull-up resistor from the USB data line D+.

Should another device connected to one of the other A-ports 202 desire to become the bus controller (assuming that it has been enabled by the present host), the hub 102 recognizes a signal from the device, which is initiated by the device disconnecting its pull-resistor from the USB data line D+. In particular, the hub 102 is configured to detect this signal and, in turn, report the occurrence of the request to the present host device. This is in accordance with standard USB 2.0 hub protocol. In response, the host device will then issue a command to the hub 102 commanding the hub 102 to switch the host control A-port 202 to the particular A-port to which the new host device is connected. The previous host device then stops generating bus traffic and replaces its pull-up resistor on the USB data line D+. This operation is also illustrated in the state diagram of FIG. 4, showing a change from state 402 to state 404 when a host control switch is requested. Further, the state changes from state 404 to state 402 as the new host device detaches its pull-up resistor to assume host control.

After the hub 102 detects that a current host has stopped generating traffic (e.g., based on five milliseconds of idleness) microcontroller 206 will reconfigure the port switching device 200 so as to designate the particular A-port 202 connected to the new host device as the host port. Additionally, the microcontroller 206 will configure the port switching device 200 to attach the USB peripheral controller 210 to that particular port. Then, as previously described, the new host device proceeds to enumerate the hub and the other devices.

When an OTG device desires to cease being the host device, the device can cease generating USB traffic and replace its pull-up resistor onto the USB data D+. This situation is illustrated in the state diagram of FIG. 4 showing movement from state 402 to state 400 where a device is indicated as attaching its pull-up resistor to release host control. When the hub 102 senses an extended idle state with no data, the hub 102 resumes its initial power-up operation as the default host of the system. As described previously, when this event occurs the USB host controller 208 is connected to the port switching device 200 under the control of the microcontroller 206 and the controller 208 proceeds to enumerate the hub 102 and host negotiation protocol (HNP) enable all of the devices that are capable of such enablement, as described previously.

Figure 6:
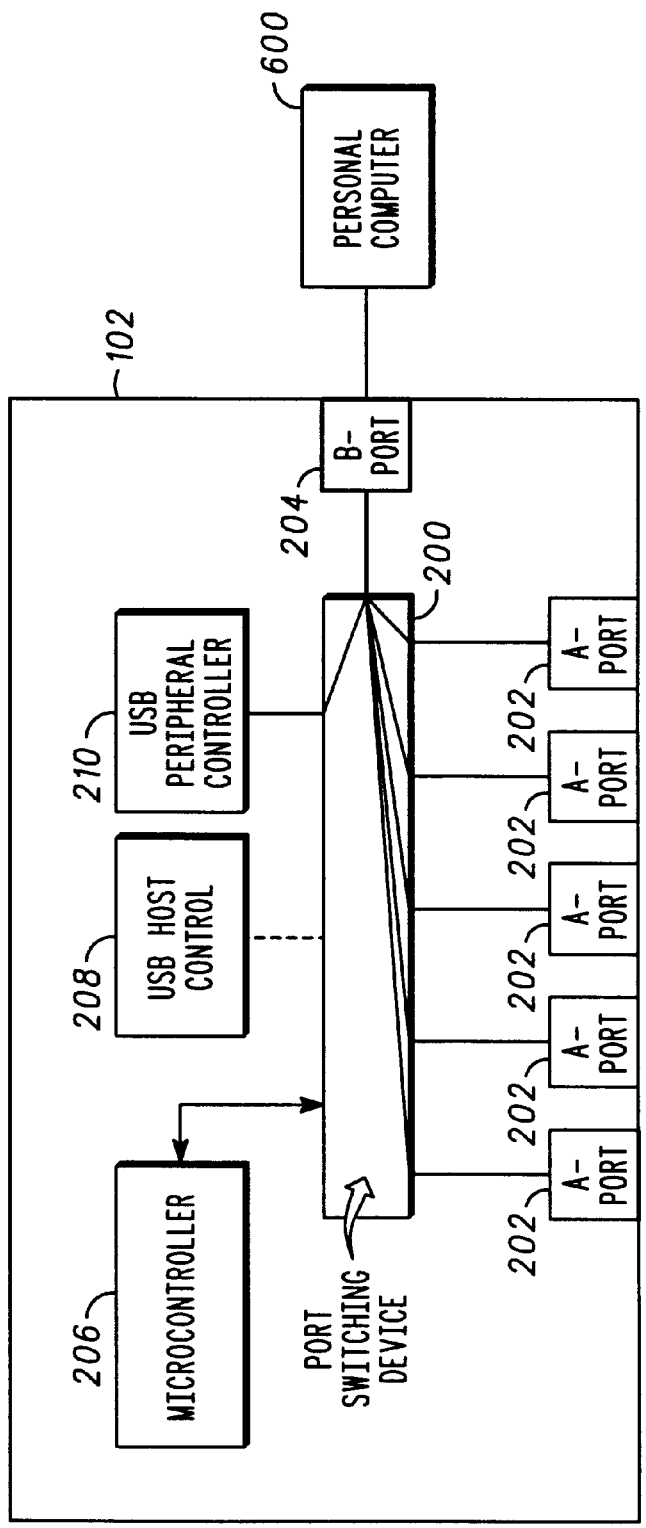
FIG. 6 illustrates still another alternate port connection of the hub of FIG. 2.

In a further example, the hub 102 may allow a personal computer 600 to be attached to a USB "B-type" port 204. In this situation, the hub 102 is configured to reconfigure the port switching device 200 such that the B-type port 204 is assigned as the host port and all of the other ports 202 are assigned to be downstream device ports as illustrated in FIG. 6. Each time of PC or similar device is connected to the B-type port, the hub 102 defers to host control by the PC, similar to an override Additionally, the USB peripheral controller 210 will remove its pull-up resistor if it was acting as an On-the-Go hub and attach to the B-port 204. As illustrated in the state diagram of FIG. 4, when a PC is attached during either of states 400 or 402, the system state moves to state 406 where the hub 102 operates as a standard USB hub. Removal of the pull-up resistor of the peripheral controller 210 also signals to any OTG device that was presently acting as a host (in the case of state 402 in FIG. 4) that the hub 102 has regained control of the USB bus as well as signaling to the personal computer 600 that the hub 102 is attached to the B-port 204. Once host control is transferred to the personal computer 600, the personal computer proceeds to enumerate the hub 102 and the other devices connected to ports 202 according to normal, non-OTG USB protocol.

Figure 7:
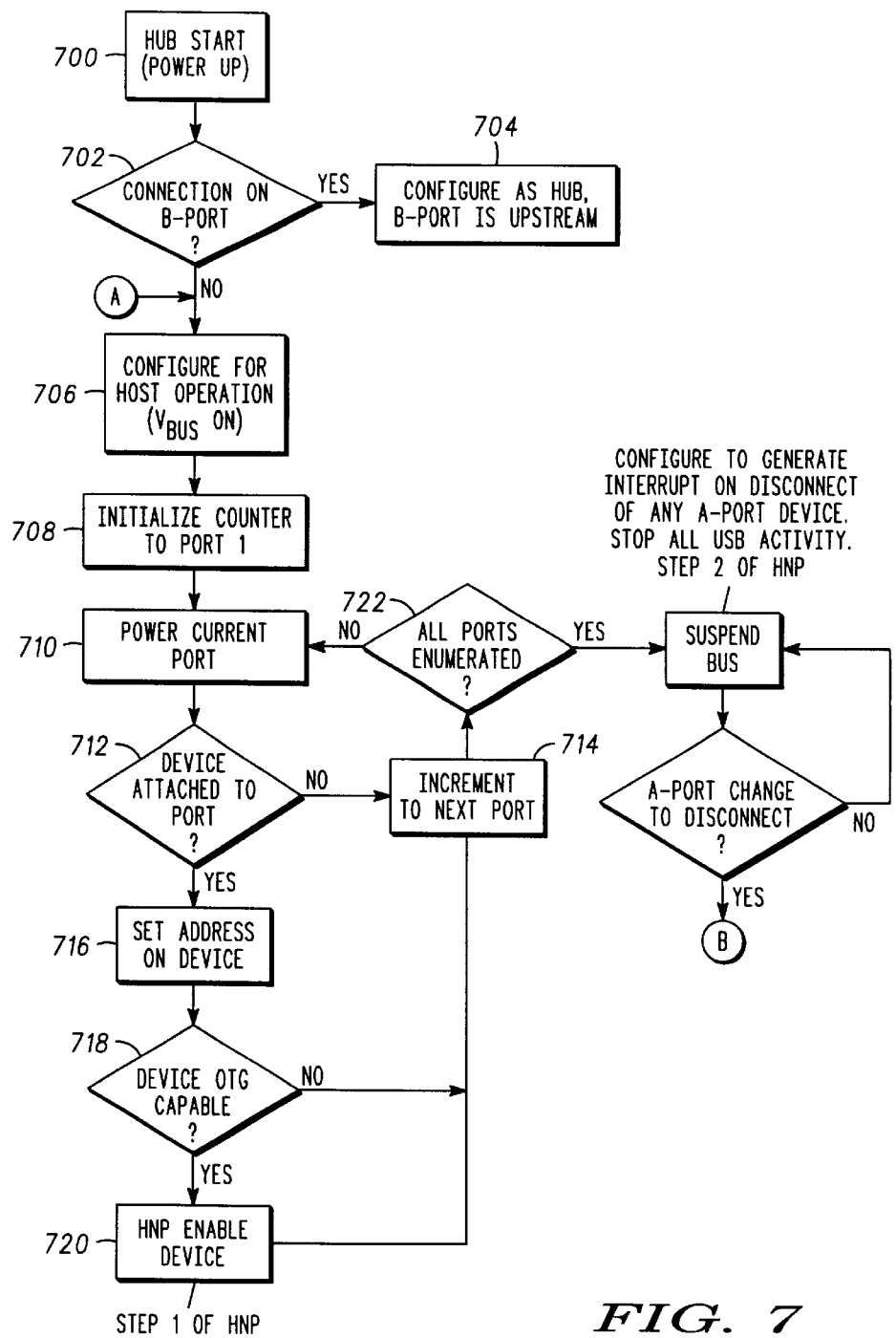
FIGS. 7–9 illustrate a flow chart of an example operation of an OTG hub.
Figure 8:
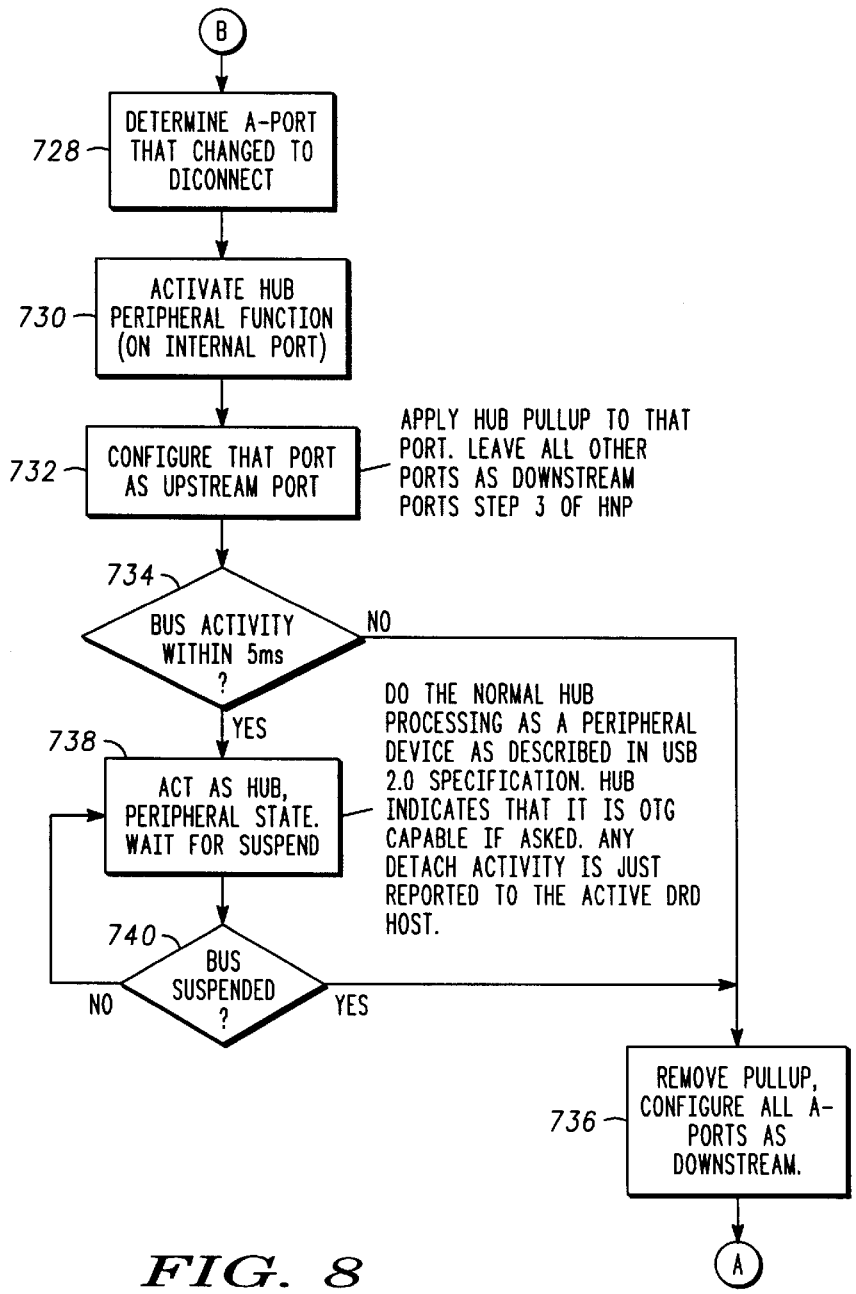
Figure 9:
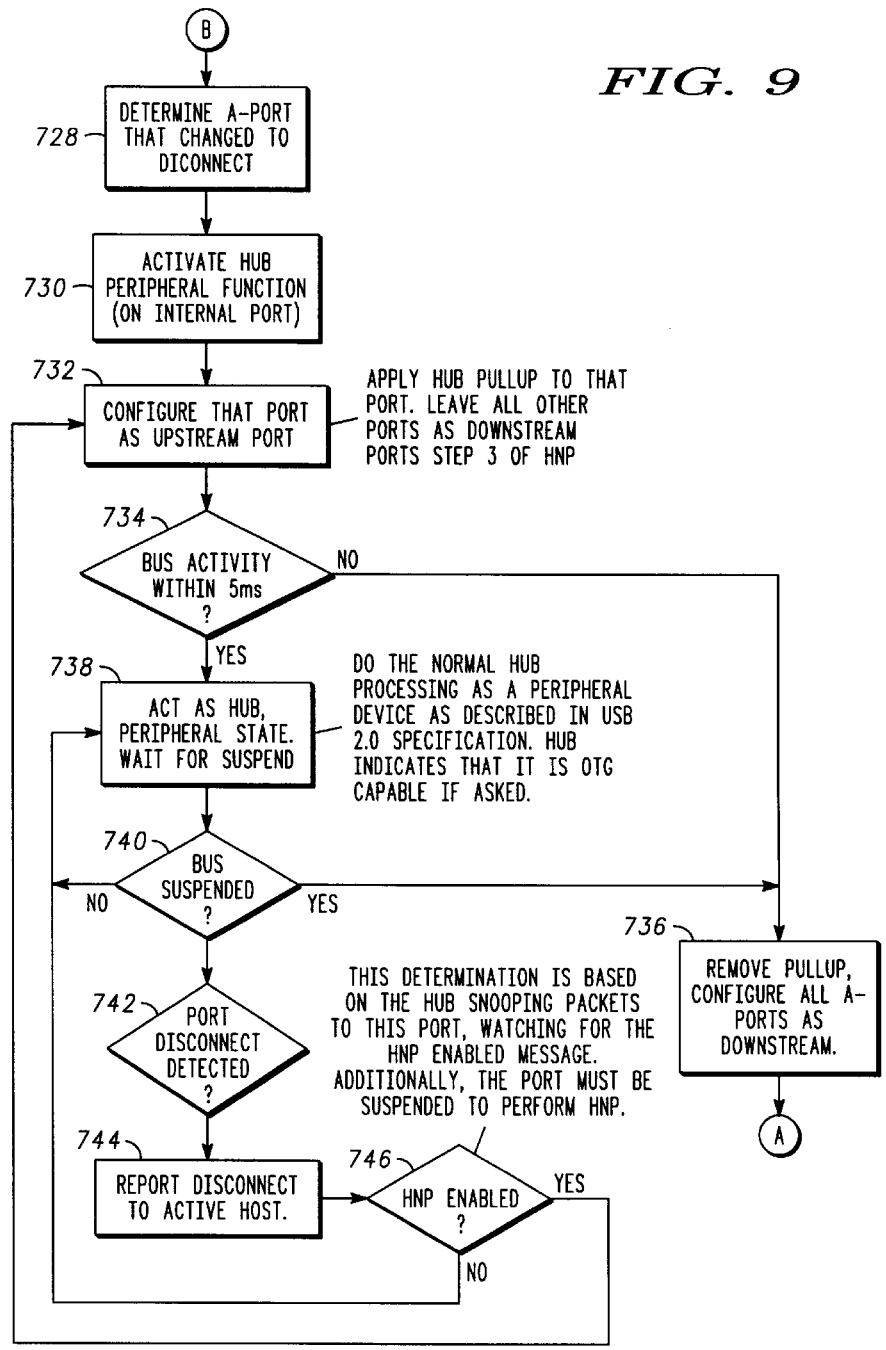

The overall operation 102 of the previously-described hub is illustrated by the flow diagrams of FIGS. 7, 8 and 9. As shown in FIG. 7, the hub 102 is initialized during a power up start (block 700). Next, the microcontroller 206 within the hub determines whether a connection exists on the B-port (block 702). If a connection exists on the B-port, the microcontroller 206 within the hub 102 configures the port switching device 200 as a standard USB hub where the B-port is the upstream port (block 704). Alternatively, if no connection exists on the B-port, the microcontroller 206 configures the hub 102 for default host operation and asserts $V_{bus}$ to supply power to the ports 202 (block 706). The hub then initializes a counter to a first port 1 of the A-type ports 202 (block 708).

Once the counter is initialized, the hub 102 proceeds to power the port to which the internal counter is currently set (block 710). Next, the hub determines whether a device is attached to the current port (block 712). If no device is attached to the port (i.e., port 1) the counter is then incremented to the next A-type port (block 714) (i.e., port 2). Alternatively, if a device is attached to the port currently under consideration, the hub sets an address on the device attached to the port (block 716). Next, the hub 102 determines whether the device connected to the port 202 is On-the-Go capable (block 718). If the device is determined as not being OTG capable, the counter is incremented to the next numbered port (block 714). Alternatively, if the device has been determined as being OTG capable, the hub 102 enables the particular device connected to the port 202 for host negotiation protocol (block 720). After the device has been HNP enabled, the counter is incremented to the next numbered port of the plurality of ports 202 in the hub 102 (block 714).

The example procedure illustrated in FIG. 7 proceeds to make the enumeration operations performed in blocks 710–720 until all the ports have had opportunity to be enumerated (block 722). Once all port enumerations have been completed the hub 102 suspends the USB bus (block 724). Additionally, the hub 102 is configured to generate an interrupt upon disconnection of any of the devices connected to the A-ports 202. As described previously, the hub 102 stops all USB activity when this occurs. It is also noted that this is a part of the host negotiation protocol. Thus, the hub 102 continues to monitor whether at least one of the A-ports 202 change state to a disconnect of a device pull-up resistor (block 726). If no change is detected, the hub 102 continues to suspend the bus. Alternatively, if a change is detected, the flow proceeds to block B, which is continued in FIG. 8.

One continuation of the procedure of FIG. 7 illustrated in FIG. 8 is an example where the hub 102 is configured as a peripheral device (this corresponds to state 402 as illustrated in FIG. 4). Furthermore, the example of FIG. 8 illustrates a configuration where the hub is compliant with the USB OTG supplement to the USB 2.0 specification. According to this example, after an A-port has changed to disconnect (i.e., the pull-up resistor has been disconnected) the hub 102 determines which of the A-ports 202 has changed state (block 728). Next, the hub 102 activates a hub peripheral function, which is accomplished by connecting the USB peripheral controller 210 (block 730). The hub 102 configures the A-port 202 that has been determined as requesting host control as the upstream port (block 732), such as by reconfiguring the switching device 200. The hub 102 applies a pull-up resistance to that port while leaving all other ports as downstream ports. It is noted also that this is a further step of the host negotiation protocol.

Once the hub 102 has been reconfigured to accommodate one of the A-type ports 202 as an upstream port, the hub 102 detects whether there is activity on the USB bus within a predetermined timeout period (block 734). As shown in the example of FIG. 8, this timeout period is approximately five milliseconds. This timeout period, however, is arbitrary, but is preferably set to a value greater than three milliseconds. If no bus activity occurs within the predetermined timeout period the hub 102 removes the pull-up resistance and reconfigures all of the A-type ports 202 as downstream ports (block 736). Alternatively, if bus activity occurs on the upstream port, the hub 102 continues to act in the peripheral state and waits for suspension of bus activity (block 738). That is, the hub 102 performs normal hub processing as a peripheral device as described in the USB 2.0 specification until bus suspension. Furthermore, the hub 102 indicates that it is OTG capable if queried and any detach activity is only reported to the active DRD OTG host. Afterwards, the hub 102 detects whether the bus is suspended (block 740). If the bus is not suspended, the process continues to wait for a suspend. Otherwise, when the bus is suspended, the hub 102 removes the pull-up resistance and reconfigures all A-ports as downstream ports (block 736). Flow then returns to block A, which returns flow to block 706 in FIG. 7 where the hub 102 once again configures for host operation (block 706).

An alternate example of a continuation of the process in FIG. 7 is illustrated in FIG. 9 showing a procedure when the hub 102 is configured as a peripheral device, but is not compliant with the OTG supplement to the USB 2.0 specification. Similar to the portion of the procedure described in blocks 728, 730, 732, 734, 736, 738 and 740 of FIG. 8, the procedure shown in FIG. 9 implements this same procedure. However, after the microcontroller 206 checks whether the USB bus is suspended (block 740) the procedure of FIG. 9 differs from that illustrated in FIG. 8. In particular, if the bus is not suspended, the hub 102 checks whether a port disconnect has been detected (block 742). If no port disconnect is detected, the procedure returns to wait for bus suspension (block 738). On the other hand, if a port disconnect is detected, the hub 102 then reports the disconnect to the current active host (block 744). After reporting the disconnect to the active host, the hub 102 checks whether host negotiation protocol is enabled. This determination may be based on hub "snooping packets" sent by the microcontroller 206 to the ports 202. The microcontroller 206 then watches for a host negotiation protocol enabled message. If host negotiation protocol is not enabled, the hub 102 then continues to wait for bus suspension (i.e., return from block, 746 to block 738). If, however, host negotiation protocol is enabled, the microcontroller 206 will then direct the port switching device 200 to be configured such that the device requesting host control is configured as the upstream port as indicated by flow from block 746 to block 732 in FIG. 9. Afterward, the procedure repeats until either bus activity is idle as determined in block 734 or the bus is suspended as determined in block 740 whereupon flow proceeds to block 736 where the microcontroller 206 configures all the A-type ports 202 as downstream ports and flow reverts back to block 706 shown in FIG. 7.

Figure 10:
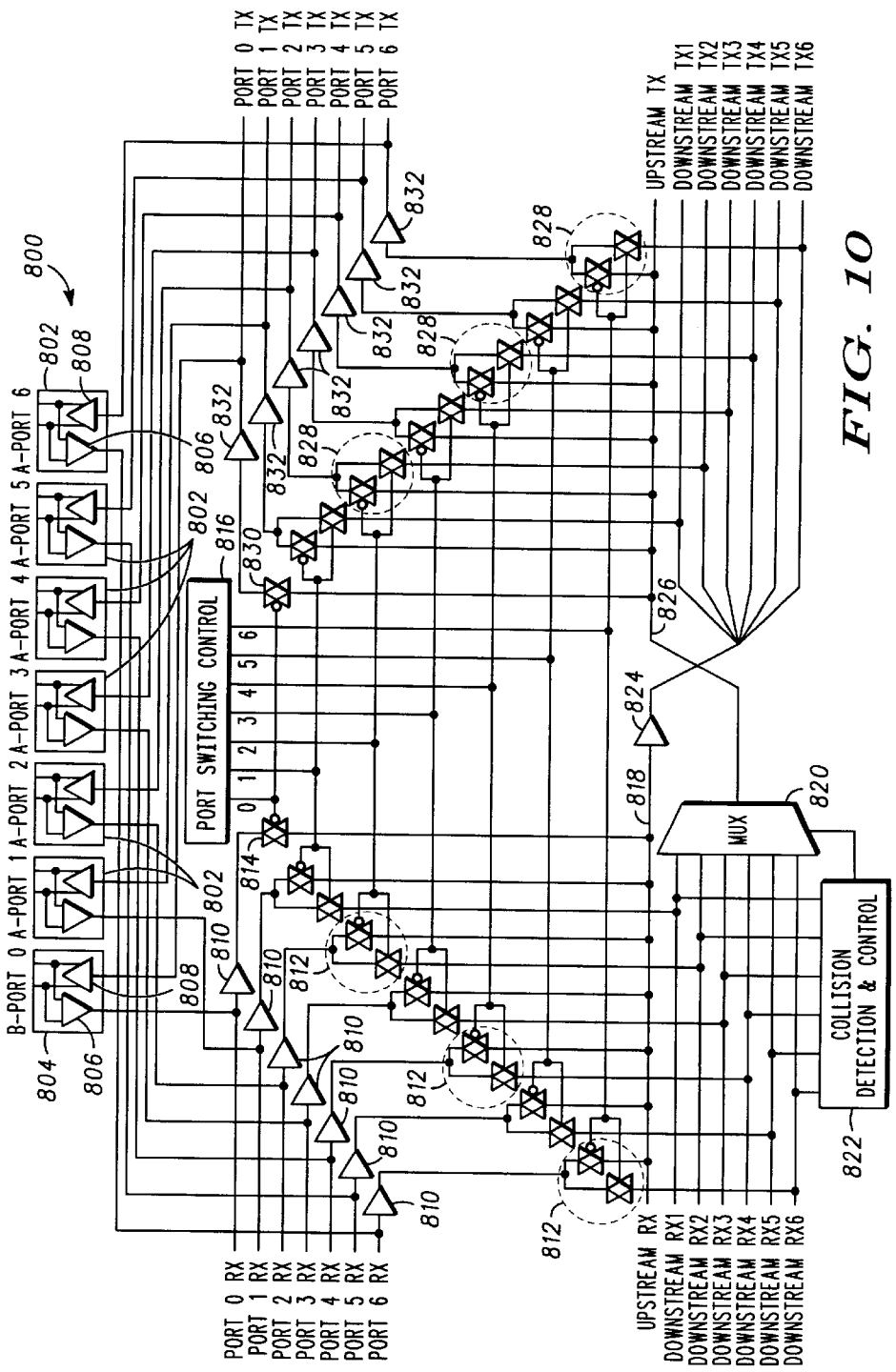
FIG. 10 illustrates an example of a wiring diagram of an OTG hub having seven ports constructed in accordance with the teachings of the present invention.

Turning to FIG. 10, this drawing shows an example schematic for a hub 800 constructed in accordance with the teachings of the present invention having six A-type ports 802 as well as a B-type port 804. As may be seen in FIG. 8, these ports may be designated as port 0 through port 6 where port 0 is the B-type port and ports 1–6 are the A-type ports 802. It is further noted that each of the port types 802, 804 contain a receive (RX) buffer 806 and a transmit (TX) buffer 808. Each of the receive buffers 806 are connected to another set of corresponding RX buffers 810, which deliver the received signals to a respective plurality of switch pairs 812 (except for the signal from the B-type port which is delivered to a single, inverting switch 814). Each of the pairs of switches 812 includes a non-inverting switch and an inverting switch (meaning that the switch is turned on when a high voltage is applied form the non-inverting switch, whereas a low voltage applied to the inverting switch causes the inverting switch to turn on). Thus, given a discrete input of either high or low voltage, switch pairs 812 alternately turn on dependent on the input voltage. Switching of the switch pairs 812 and switch 814 is controlled by a port switching control 816.

The outputs of the inverting type switches of the switch pairs 812 and switch 814 are connected to an upstream receive bus 818 whereas the outputs of the non-inverting switches of the switch pairs 812 are delivered to respective downstream receive buses RX1 through RX6. Each of these receive buses RX1 through RX6 are input to a multiplexer 820, which is controlled by a collision detection and controller 822. The collision detection and controller 822 detects collisions occurring between received signals and selectively arbitrates between these signals thereby controlling the output of the multiplexer 820.

The upstream receive bus 818 is connected through a buffer 824 to a 10 plurality of downstream transmit lines TX1 through TX6. The output of the multiplexer 820 is, in turn, connected to an upstream transmit bus 826. Connected to the downstream transmit lines TX1–TX6 are non-inverting switches of a plurality of switch pairs 828, which each also include an inverting switch. Each of the inverting switches of the switch pairs 828 is connected to the upstream transmit bus 826. Switching control for the switch pairs 828 is also performed by the port switching control 816. It is noted that the control voltages delivered to the switch pairs 828 are the same as those delivered to corresponding switch pairs 812. Furthermore, the correspondence between each of the switch pairs 812 and 828 is dependent on a particular one of the ports. For example, a switch pair 812 connected to the receive buffer 806 of port 1 receives the same control voltage as the switch pair 828 that is connected to the transmit buffer 808 of the same port 1.

Also connected to the upstream transmit bus 826 is an inverting switch 830, which is controlled by the same control voltage from port switching control 816 as inverting switch 814. The outputs of each of the switch pairs 828 and switch 830 are connected via a plurality of respective buffers 832 to corresponding transmit buffers 808 of the ports 802 and 804. This structure illustrated in FIG. 10 affords selective switching for either designating the B-type port 804 as the upstream port or selectively assigning one of the A-type ports 802 as the upstream port. Examples of how this disclosed structure achieves this function will be described in connection with FIGS. 11–12.

Figure 11:
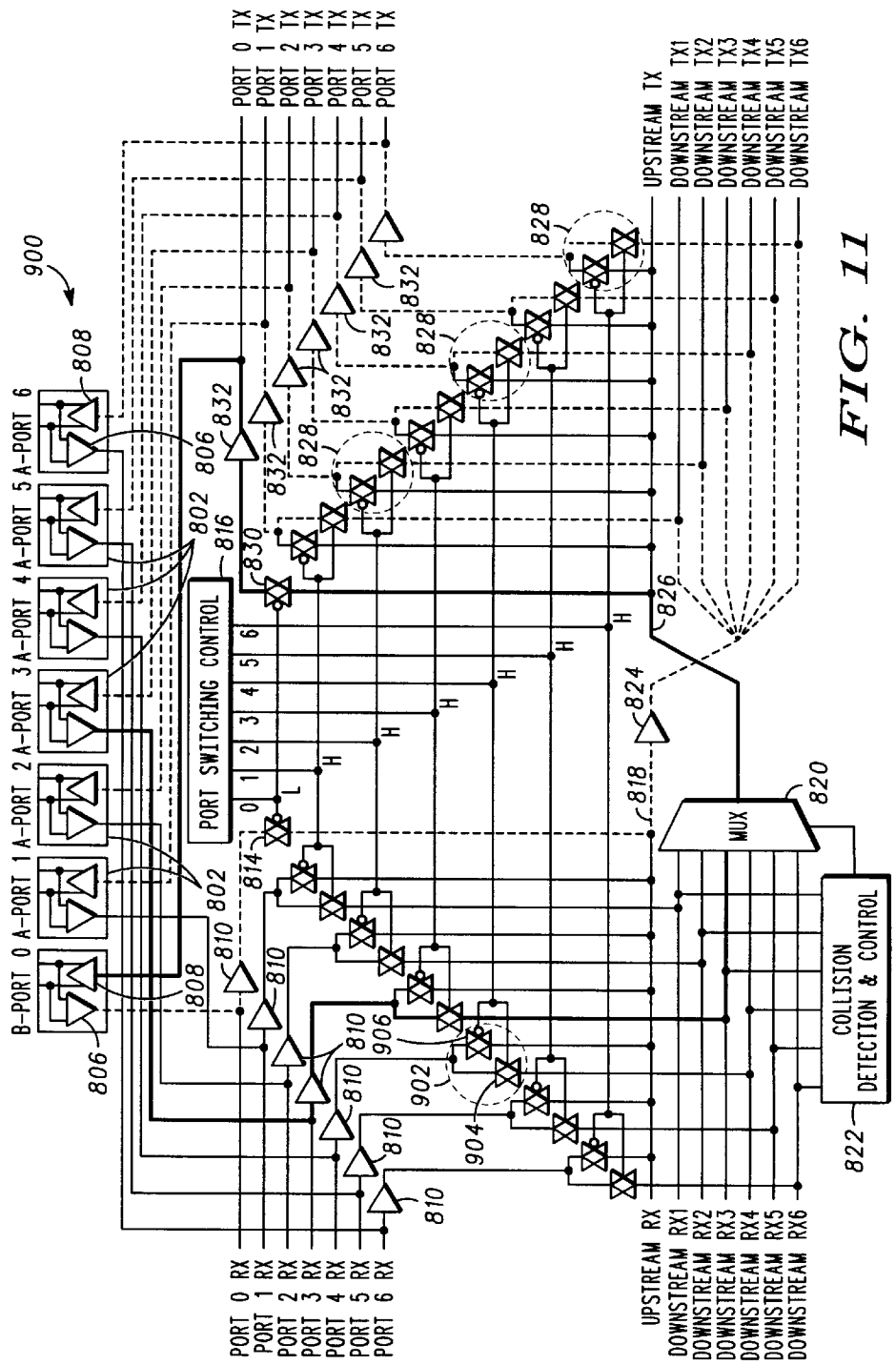
FIG. 11 illustrates a particular example of signal routing for the circuit of FIG. 8 given a particular configuration where a PC is connected to the hub.

The example of FIG. 11 illustrates the case where a PC (not shown), for example, is connected to the B-port 804 (i.e., port 0). Thus, in this example the hub 800 is configured to behave like a standard USB hub similar to the example of FIG. 5. In this configuration, the port switching control 816 is configured to output a low voltage to the port 0 path switches 814 and 830, whereas all of the remaining control signals from the port switching control 816 to the switch pairs 812 and 828 are high voltage. Thus, the upstream port 0 is connected to the upstream receive bus 818 and the transmit buffer 808 of port 0 is connected to the output of multiplexer 820.

As illustrated in FIG. 11 a signal received on B-type port 0 follows a particular receive path (indicated with a dashed line). Data received from this upstream port 0 is directly transmitted to the transmit buffers 808 of ports 1 through 6 via buffer 824 and the downstream transmit lines TX1 through TX6. Because the data received from the upstream B-type port is broadcast to all of the downstream ports 802, this configuration is in accordance with the USB 2.0 specification.

Also illustrated in FIG. 11 is the transmit path for signals sent to the transmit buffer 808 of the B-type port 0 (indicated with a solid, bolded line). In this particular example, the downstream port 802 labeled "port 4" is shown sending data to the upstream port "port 0". Thus, a signal received by the receive buffer 806 of port 4 is shown routed to a switch pair 902 corresponding to port 4. Since the port switching control 816 asserts a high signal, a non-inverting switch 904 of the pair 902 turns on while an inverting switch 906 is turned off. Hence, the signal is routed to downstream receive line RX4, which is connected to multiplexer 820. As described previously, the multiplexer 820 arbitrates between the downstream receive lines under the direction of control 822. The output of the multiplexer 820 is connected to the upstream transmit bus 826. As shown in FIG. 11, the signal from port 4 is delivered to receive buffer 808 of port 0 via inverting switch 830 and buffer 832.

Figure 12:
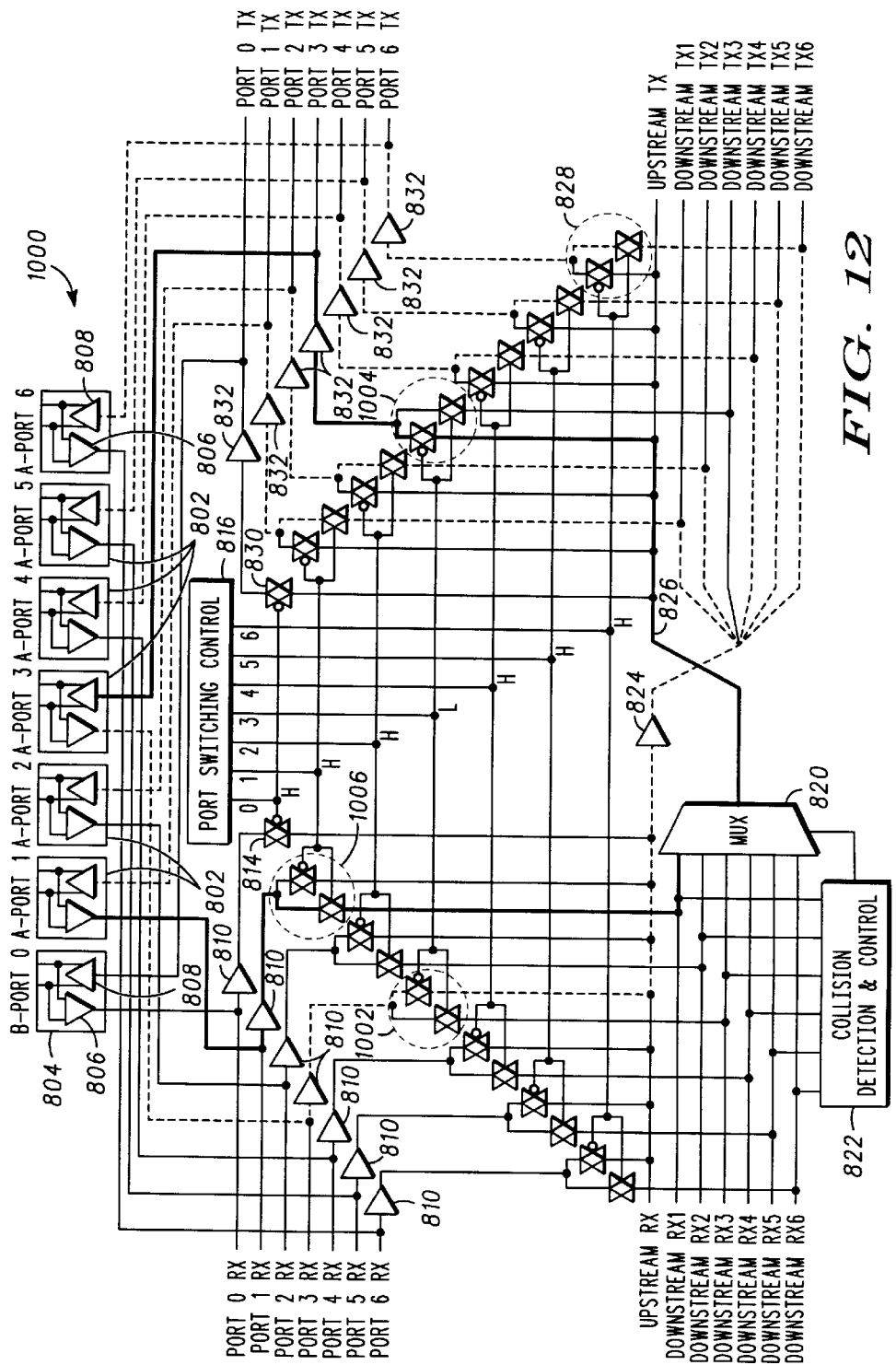
FIG. 12 illustrates a further example of signal routing for the hub of FIG. 8 according to another particular configuration where an "A-type" port serves as a host device.

FIG. 12 illustrates an example of the hub 800 configured to be On-the-Go compatible. In this example, an A-type port 802 (e.g., port 3) is selected as the host port by the port switching control 816. This selection is effected by asserting high signals on all of the outputs of the port switching control 816 except for the input to the port 3 switch pairs 1002 and 1004, which receive a low signal. As a result, a signal received by the receive buffer 806 of the upstream port 3 is broadcast to the remaining ports 1, 2 and 4–6 as indicated by the dashed line in FIG. 12. It is also noted that since the example of FIG. 12 illustrates a USB On-the-Go hub, the signal can not be transmitted to the B port 804.

Additionally, the example of FIG. 12 illustrates when a device connected to port 1, for example, sends a signal to the host port 3 via hub 800 (i.e., from the receive buffer 806 of port 1 to the transmit buffer 808 of port 3). Here, the signal path is illustrated by a solid bold line from port 1 to port 3 via buffer 810, the non-inverting switch of switch pair 1006, multiplexer 820, the inverting switch of switch pair 1004 to the transmit buffer 808 of port 3. The selection of the particular signal from port 1 is accomplished by the collision detection and control 822, thereby allowing the signal to pass to the upstream transmit bus 826. It is also noted that this is in accordance with the USB 2.0 specification.

Figure 13:
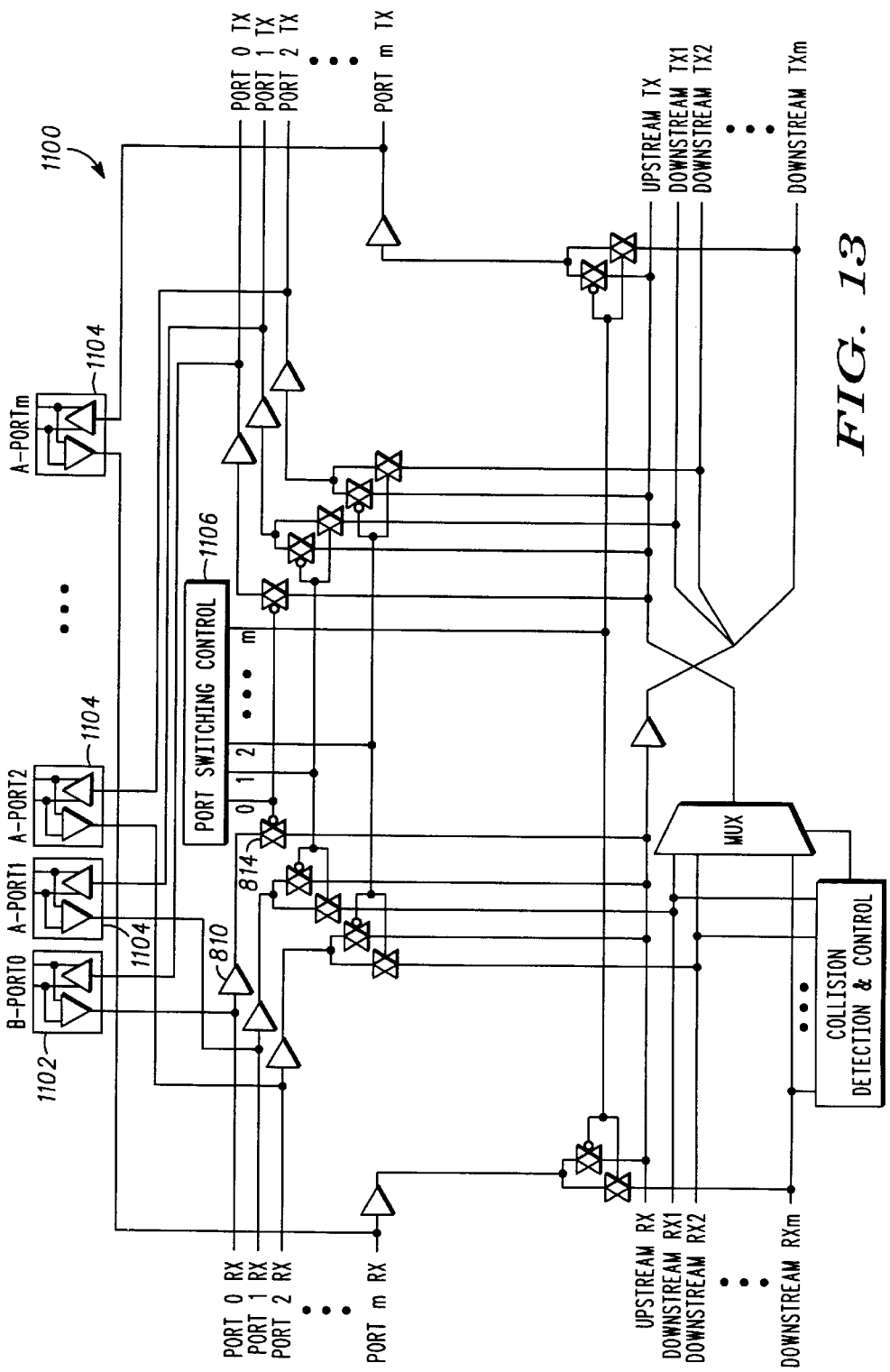
FIG. 13 illustrates a wiring diagram of another example of an OTG hub.

In another example, FIG. 13 illustrates an example where any number of m+1 ports may be utilized in a USB OTG compatible hub 1100. As shown, a B-type port 1102 labeled port 0 is included as well as an "m" number of A-type ports 1104, which are labeled as ports 1 through "m". Similar to the previous examples of FIGS. 10–12, the hub 1100 includes a port switching control 1106 that generates control signals to configure the ports as either upstream or downstream based on which particular port is granted host control. Only one port is configured as the upstream port at any point in time. Thus, the port 1104 with host control is configured as the upstream port whereas all other A-type ports 1104 are configured as downstream ports. As with the previous examples, if a personal computer is attached at any time to the B-port 1102 (this B-type port 1102 being optional), the B-type port 1102 is enabled (like an override), configured as the upstream port and is given host control. When any of the A-type ports 1104 have host control and no personal computer is attached to the B-type port 1102, this port is disabled Broadly, the port switching control 1106 function asserts the output control line corresponding to the upstream port and D-asserts (i.e., provides a high signal) for the control lines corresponding to the downstream ports. These control signals turn on and off signal paths between the various ports such that the hub 1100 is properly configured for operation according to the USB 2.0 specification. That is, the port configured as the upstream port behaves like a standard upstream port and the ports configured as the downstream ports behave like standard downstream ports as defined in USB 2.0 specification.

Although certain apparatus and methods constructed in accordance with the teachings of the invention have been described herein, coverage of this patent is not limited thereto. On the contrary, this patent covers all embodiments of the teachings of the invention falling fairly within the scope of the appended claims, either literally or under the doctrine of equivalents.

What is claimed is:

1. A Universal Serial Bus hub apparatus comprising:
    a plurality of ports configured to connect the USB hub apparatus to one or more external devices;
    a controller device; and
    a port switching device coupled to the controller device and the plurality of ports and controlled by the controller device for selectively connecting any one of the plurality of ports to serve as a host port and the other ones of the plurality of ports to serve as device ports.

2. The apparatus according to claim 1, wherein each of the plurality of ports comprises an A-type of Universal Serial Bus port.

3. The apparatus according to claim 2, further comprising:
    an override port comprising a B-type of Universal Serial Bus port allowing connection of a personal computer to obtain host control.

4. The apparatus according to claim 1 further comprising:
    a collision detector and control device configured to detect signal collisions occurring between signals received by the plurality of ports acting as device ports from the external devices that are being transmitted to the host port and mitigate the collisions by selectively switching a multiplexing circuit.

5. The apparatus according to claim 1, wherein the controller detects when the port acting as host port is idle for a predetermined period and controls the port switching device to connect the USB hub apparatus as a host control.

6. The apparatus according to claim 1, wherein the controller comprises a microcontroller, a USB host controller and a USB peripheral controller.

7. The apparatus according to claim 6, wherein the microcontroller is configured to communicatively connect the USB host controller to the port switching device during a start-up of the USB hub apparatus.

8. The apparatus according to claim 7, wherein the microcontroller is configured to detect when a request by an external device to act as host control is received via one of the plurality of ports to which the external device is attached and control the switching device to reconfigure the switching device such that all other ports of the plurality ports are device ports in response to the detection of the request.

9. The apparatus according to claim 8, wherein the microcontroller is configured such that when a USB peripheral controller port acting as host port is idle for a predetermined period the microcontroller controls the port switching device to connect the USB hub apparatus as a host control.

10. The apparatus according to claim 1 wherein the USB hub apparatus is configured to operate according to the On-the-Go supplement to the USB 2.0 specification and the ports are configured to be connectable to On-the-Go dual-role devices.

11. The apparatus according to claim 1, wherein the controller is configured to assume host control during the occurrence at least one of start up of the USB hub apparatus, idleness of a current host device and transfer of host control between two peripheral devices.

12. A USB communication system comprising:
    one or more dual-role peripheral devices; and
    a hub apparatus comprising:
        a plurality of ports configured to connect the hub apparatus device to the one or more peripheral devices;
        a controller device; and
        a port switching device coupled to the controller device and the plurality of ports and controlled by the controller device for selectively connecting any one of the plurality of ports to serve as a host port allowing a dual-role peripheral of the one or more dual-role peripheral device to assume host control and the other ones of the plurality of ports to serve as device ports.

13. The system according to claim 12, wherein each of the plurality of ports comprises an A-type of Universal Serial Bus port.

14. The system according to claim 13, further comprising:
an override port comprising a B-type of Universal Serial Bus port allowing connection of a personal computer to obtain host control.

15. The system according to claim 12 further comprising:
a collision detector and control device configured to detect signal collisions occurring between signals received by the plurality of ports acting as device ports from the external devices that are being transmitted to the host port and mitigate the collisions by selectively switching a multiplexing circuit.

16. The system according to claim 12, wherein the controller detects when the port acting as host port is idle for a predetermined period and controls the port switching device to connect the hub apparatus as a host control.

17. The system according to claim 12, wherein the controller comprises a microcontroller, a USB host controller and a USB peripheral controller.

18. The system according to claim 17, wherein the microcontroller is configured to communicatively connect the USB host controller to the port switching device during a start-up of the hub apparatus.

19. The system according to claim 18, wherein the microcontroller is configured to detect when a request by an external device to act as host control is received via one of the plurality of ports to which the external device is attached and control the switching device to reconfigure the switching device such that all other ports of the plurality ports are device ports in response to the detection of the request.

20. The system according to claim 19, wherein the microcontroller is configured such that when a USB peripheral controller port acting as host port is idle for a predetermined period the microcontroller controls the port switching device to connect the hub apparatus as a host control.

21. The system according to claim 12 wherein the hub apparatus is configured to operate according to the On-the-Go supplement to the USB 2.0 specification and the ports are configured to be connectable to On-the-Go dual-role devices.

22. The system according to claim 12, wherein the controller is configured to assume host control during the occurrence at least one of start up of the hub apparatus, idleness of a current host device and transfer of host control between two peripheral devices.

23. A method of operating a USB hub having a plurality of ports and a hub controller for controlling routing of the ports, the method comprising:
operating the hub as a host device having host control during a start-up period;
determining using the hub controller which of the plurality of ports are connected to corresponding external devices and assigning addresses to those devices;
enabling a host negotiation protocol on the external devices; and
transferring host control from the hub to a first external device connected to a first port of the plurality of ports when a request for host control is received by the hub controller from the first external device via the first port, the first port being any of the plurality of ports.

24. The method according to claim 23 further comprising:
transferring host control back to the hub controller from the first external device after an external device to which host control was transferred no longer requests host control according to a predetermined condition.

25. The method according to claim 24, wherein the predetermined condition comprises when no communication occurs on the port to which the first external device is connected indicating that the first external device is idle.

26. The method according to claim 24, wherein the predetermined condition comprises when a signal from the first external device is received by the hub indicating that the external device no longer requests host control.

27. The method according to claim 23, further comprising:
transferring host control to a second external device connected to a second port of the plurality of ports when a signal requesting host control is received by the hub via the second port from the second external device.

28. The method according to claim 23, further comprising:
transferring host control to an override port of the plurality of ports when a personal computer is connected to the override port.

* * * * *

UNITED STATES PATENT AND TRADEMARK OFFICE
CERTIFICATE OF CORRECTION

PATENT NO. : 6,732,218 B2
DATED : May 4, 2004
INVENTOR(S) : Eric J. Overtoom et al.

It is certified that error appears in the above-identified patent and that said Letters Patent is hereby corrected as shown below:

Column 10,
Line 56, please delete "occurrence at least one of start up" and insert -- occurrence of at least one of start up --.
Line 63, please delete "apparatus device to" and insert -- apparatus to --.

Signed and Sealed this

Thirty-first Day of August, 2004

JON W. DUDAS
*Director of the United States Patent and Trademark Office*